US012534354B2

(12) United States Patent
Kellhammer et al.

(10) Patent No.: US 12,534,354 B2
(45) Date of Patent: Jan. 27, 2026

(54) PRODUCTION SYSTEM FOR PRODUCING, PROCESSING AND/OR FILLING CONTAINERS, AND METHOD FOR THE PRODUCTION CONTROL AND/OR SYSTEM SPECIFICATION OF THIS PRODUCTION SYSTEM

(71) Applicant: KRONES AG, Neutraubling (DE)

(72) Inventors: Thomas Kellhammer, Bach a. d. Donau (DE); Johannes Strauss, Wolfsegg (DE)

(73) Assignee: KRONES AG, Neutraubling (DE)

( * ) Notice: Subject to any disclaimer, the term of this patent is extended or adjusted under 35 U.S.C. 154(b) by 59 days.

(21) Appl. No.: 18/684,487

(22) PCT Filed: Jul. 6, 2022

(86) PCT No.: PCT/EP2022/068708
§ 371 (c)(1),
(2) Date: Feb. 16, 2024

(87) PCT Pub. No.: WO2023/020743
PCT Pub. Date: Feb. 23, 2023

(65) Prior Publication Data
US 2024/0425340 A1  Dec. 26, 2024

(30) Foreign Application Priority Data
Aug. 17, 2021  (DE) ............... 10 2021 121 305.3

(51) Int. Cl.
*B67C 3/00* (2006.01)
*B67C 7/00* (2006.01)
*B67C 3/22* (2006.01)

(52) U.S. Cl.
CPC ............ *B67C 3/007* (2013.01); *B67C 7/0006* (2013.01); *B67C 2003/227* (2013.01); *B67C 2007/006* (2013.01); *B67C 2007/0066* (2013.01)

(58) Field of Classification Search
CPC ............... B67B 3/26; B67C 2003/227; B67C 2007/006; B67C 2007/0066; B67C 3/007;
(Continued)

(56) References Cited

U.S. PATENT DOCUMENTS

2006/0026971 A1* 2/2006 Sharpe .................... G01J 5/026
62/126
2011/0118868 A1* 5/2011 Herrmann ........ G05B 19/41865
700/214
(Continued)

FOREIGN PATENT DOCUMENTS

DE  102008053765 A1  4/2010
DE  102017200266 A1  7/2017
(Continued)

OTHER PUBLICATIONS

ISA European Patent Office, International Search Report Issued in Application No. PCT/EP2022/068708, Oct. 25, 2022, WIPO, 6 pages.

*Primary Examiner* — Himchan Song
(74) *Attorney, Agent, or Firm* — McCoy Russell LLP

(57) ABSTRACT

The invention relates to a production system for producing, processing and/or filling containers and to a method for the production control and/or system specification of this production system. According to the invention, at least one visually imperceptible intensive state variable or material characteristic of components of the containers, which components are provided as solid bodies, is measured in the area of the production system with respect to the batch and/or object in question. Furthermore, at least one production
(Continued)

process proceeding therein for treating and/or transporting the components/containers by machine is controlled on the basis of the measured material characteristic and/or intensive state variable. In this way, quality fluctuations of the components can be quantified and can be used both in the control and in a simulation of the individual production processes in order to optimize these production processes and the associated process units.

16 Claims, 3 Drawing Sheets

(58) Field of Classification Search
CPC ............ B67C 7/0006; G05B 19/41875; G05B 2219/37373; G05B 2219/37431
See application file for complete search history.

(56) References Cited

U.S. PATENT DOCUMENTS

| | | | | |
|---|---|---|---|---|
| 2012/0210674 | A1* | 8/2012 | Perl | B65B 27/04 53/589 |
| 2014/0138276 | A1* | 5/2014 | Smith | B65D 55/026 206/459.1 |
| 2015/0122688 | A1* | 5/2015 | Dias | A47G 19/027 206/459.1 |
| 2015/0301521 | A1* | 10/2015 | Byron | G05B 19/4183 700/108 |
| 2015/0307245 | A1* | 10/2015 | Puccini | G01K 1/022 702/130 |
| 2017/0156540 | A1* | 6/2017 | Wheatley | B67D 1/0078 |
| 2019/0302082 | A1* | 10/2019 | Cunningham | G01N 33/146 |
| 2020/0189898 | A1* | 6/2020 | Theopold | G05B 23/0235 |
| 2022/0135387 | A1* | 5/2022 | Will | B67C 7/00 700/244 |

FOREIGN PATENT DOCUMENTS

| | | |
|---|---|---|
| DE | 102017111066 A1 | 11/2018 |
| DE | 102017120861 A1 | 3/2019 |
| DE | 102019203060 A1 | 9/2020 |
| EP | 2874032 A2 | 5/2015 |
| JP | 2000159291 A | 6/2000 |
| WO | 0240391 A1 | 5/2002 |
| WO | 2008027569 A2 | 3/2008 |

\* cited by examiner

PRODUCTION SYSTEM FOR PRODUCING, PROCESSING AND/OR FILLING CONTAINERS, AND METHOD FOR THE PRODUCTION CONTROL AND/OR SYSTEM SPECIFICATION OF THIS PRODUCTION SYSTEM

CROSS REFERENCE TO RELATED APPLICATIONS

The present application is a U.S. National Phase of International Application No. PCT/EP2022/068708 entitled "PRODUCTION SYSTEM FOR PRODUCING, PROCESSING AND/OR FILLING CONTAINERS, AND METHOD FOR THE PRODUCTION CONTROL AND/OR SYSTEM SPECIFICATION OF THIS PRODUCTION SYSTEM," and filed on Jul. 6, 2022. International Application No. PCT/EP2022/068708 claims priority to German Patent Application No. 10 2021 121 305.3 filed on Aug. 17, 2021. The entire contents of each of the above-listed applications are hereby incorporated by reference for all purposes.

TECHNICAL FIELD

The invention relates to a method for production control and/or system specification of a production system for producing, processing and/or filling containers and to such a production system.

BACKGROUND AND SUMMARY

Such production systems are known to comprise mechatronic process units, for example in the form of machines or aggregates, for carrying out physical production processes, for example in heating preforms, stretch blow molding of containers from such preforms, labeling the containers, filling liquid products, for example beverages, into the containers, closing the filled containers, packing the containers, or cleaning the containers, for example when re-using glass bottles.

The containers are generally successively constructed from components such as, for example, container bodies, labels, and closure caps or are equipped with such components. In this case, it is known from the prior art to specify components of the containers or the containers to be produced themselves in the form of solid bodies themselves with regard to their material properties and additionally to check with regard to correct size, shape, mass and/or color before integration into the corresponding production process. If necessary, other visually perceptible properties of the components or containers are also checked, such as the turbidity of a preform or container body or similar.

In addition, it is common practice to check components provided in the form of fluids, such as glue, and/or the products to be filled, for example a beverage, on the input side for specific properties, such as temperature, viscosity, conductance and/or turbidity.

However, it has been found that, above all with regard to a type-specific power optimization of the individual production processes and/or the production system, overall undesired quality fluctuations or fault states occur again and again, which can only be insufficiently limited or even eliminated with the inspections described above.

In addition, there is often no systematic approach with which such shortcomings can be analyzed in a targeted and reproducible manner and possibly corrected. This relates in principle both to the production control and to the system specification regarding performance characteristic values and design features for the individual production processes and associated mechatronic process units.

There is thus a need for improved methods in this respect for production control and/or system specification and for correspondingly improved production systems.

The object posed is achieved with a method in accordance with claim 1 and with a production system in accordance with claim 10. Preferred embodiments are specified in the dependent claims.

The method described accordingly serves for production control and/or system specification of a production system for producing, processing and/or filling containers, such as bottles or cans, for example. For this purpose, at least one visually imperceptible intensive state variable or a visually imperceptible material characteristic of components of the containers, which components are provided as solid bodies, is measured in the area of the production system with respect to the batch in question and/or with respect to the object in question, and at least one production process proceeding therein for treating and/or transporting the components or containers by machine is controlled on the basis of the measured material characteristic and/or the measured intensive state variable.

Individual or batch-related deviations of the corresponding material characteristic and/or intensive state variable from user-specified specifications of the components can thereby be taken into account during the open-loop/closed-loop control of the production processes in order to adjust the latter, for example, to currently deviating properties of the components to be processed and/or to better adapt specifications of the components to the requirements of the individual production processes.

It has surprisingly been found here that the influence of individual material characteristics and/or intensive state variables on the production results of individual production processes can have a comparatively strong effect and thus can cause variations in quality of production and thereby also hinder the optimization of the processes.

The intensive state variables and material characteristics are visually imperceptible properties which, due to their therefore relatively poor accessibility for an inspection during ongoing production operation, are usually neglected.

In other words, conventional quality controls on components of containers are limited to the inspection of extensive state variables, i.e., those that depend on the size and shape of the respective components. An example of this is weighing.

By contrast, intensive state variables are known to be those that are basically independent of the size and shape of the corresponding solid body, such as the temperature of a container or a component thereof.

The material characteristics are known to be material properties of containers or their components, for example an elasticity characteristic value or a coefficient of friction.

In this context, it has been found that such material characteristics and/or intensive state variables can significantly influence the mechanical behavior of the components/containers during their processing and/or transport and, with corresponding variations of such "hidden" properties of the components/containers, then hinder the optimization of the production processes and associated process units.

The material characteristic/intensive state variable can be measured, for example, immediately before provision at each individual component or randomly for a batch of the components. In addition, individual measurements of the components after integration into the associated product stream, i.e. as so-called inline inspection, are possible.

The provided components are preferably preforms, container bodies, labels, label strips, closure caps, and/or packaging films. For example, an elasticity characteristic or a coefficient of friction can be measured as an associated material characteristic and/or a temperature or a humidity as an intensive state variable in order to adjust the associated production process to the measured actual value of the material characteristic/intensive state variable and/or to adapt the design of the associated process unit to the occurring fluctuations of the actual value of the material characteristic/intensive state variable and/or to compensate for the fluctuations.

Preferably, the material characteristic/intensive state variable measured thereon is assigned to the containers/components over a plurality of production processes in the form of an accompanying data record. That is to say, the corresponding material characteristic/intensive state variable accompanies the corresponding component/the corresponding container in the sense of an electronic marking/accompanying information at least over a portion of the production relevant in this regard, in particular until the completion of the particular production. This enables a simple and unmistakable assignment of the material characteristic/intensive state variable to individual production results of the production processes.

The measured material characteristics/intensive state variables at the corresponding production unit are thus available individually for each individual component/container to be processed, optionally in order to adapt and/or optimize the corresponding production process individually for each individual container and/or on the basis of a statistical evaluation of production results individually associated with one another and material characteristics/intensive state variables.

Preferably, a production result measured for monitoring at least one of the production processes is also individually assigned to the containers/components thereof and is calculated by machine with the associated material characteristic/intensive state variable. A calculation result resulting therefrom is then incorporated into the machine open-loop/closed-loop control of at least the monitored production process and/or into the specification of performance characteristic values and/or design features of the production process/the associated process unit. Systematic relationships between the material characteristics/intensive state variables and production results can thereby be determined and used for optimizing the production processes and associated process units.

The measured material characteristic/intensive state variable is preferably treated in a physical calculation model for simulating the production process or at least one partial process thereof, in particular during ongoing production. Furthermore, a simulation result resulting therefrom is incorporated into the machine open-loop/closed-loop control of the production process and/or into the specification of associated power characteristic values and design features.

Such a physical calculation model can systematically simulate how fluctuations of material characteristics/intensive state variables influence production results, and whether/how design measures are suitable for compensating for disadvantageous influences of fluctuating material variables/intensive state variables. These simulations can improve both the ongoing production process and also contribute afterwards to the apparatus optimization of the production process/process unit.

The physical calculation model can be integrated into a higher-level system model of the production system and/or of the corresponding process unit. By means of the system model, for example, product streams, data streams, communication paths and/or interactions between the individual process units can be mapped and simulated by calculation. The process units can then be subjected to open-loop/closed-loop control on the basis of the system model.

Preferably, the production process is parameterized type-specifically automatically on the basis of the measured material characteristic/intensive state variable. This is to be understood as meaning that type-specific rearrangements of the production processes/process units are carried out not only on the basis of the, for example, user-specified properties of the components/containers. Rather, actual values of the material characteristic/intensive state variable measured with respect to the object in question and/or with respect to the batch in question can also be automatically taken into account by the corresponding control system. Machine and treatment parameters can be set automatically on this basis.

Preferably, at least one extensive state variable of the components is also measured in the area of the production system with respect to the batch in question and/or with respect to the object in question and then is incorporated into the control and/or a rake simulation of the production process together with the measured material characteristic and/or measured intensive state variable. As a result, the dimensions and properties dependent thereon, such as the mass, of the components can additionally be taken into account in the control/modeling and their influence can be assessed in relation to the material characteristic/intensive state variable.

The corresponding production process preferably relates to one of the following processing steps on the components/containers: heating in particular of preforms or container bodies; forming in particular of container bodies, cooling in particular of container bodies; overhead turning in particular of container bodies; inner coating in particular of container bodies; printing in particular of container bodies, labeling in particular of container bodies; cleaning in particular of container bodies; filling of liquids; and closing in particular by applying closure caps.

The influence of the material characteristic/intensive state variable can then be optimized, for example, separately for the individual production processes or also for a group of production processes or the entire production, taking into account interactions between individual production processes in terms of control and/or design.

The production system described serves for producing, processing and/or filling containers and comprises mechatronic process units for treating and/or transporting the containers or components thereof provided as solid bodies. Furthermore, the production system comprises a control system for open-loop/closed-loop control of the process units, in particular by the method according to at least one of the preceding claims.

According to the invention, the production system comprises at least one input-side inspection unit for the batch-related and/or individually object-related measurement of at least one visually imperceptible intensive state variable or a visually imperceptible material characteristic of the components. Furthermore, the control system is then programmed for open-loop/closed-loop control of at least one of the process units taking into account the measured material characteristic/intensive state variable. The advantages described with respect to claim 1 can thus be achieved.

Preferably, the individual process units are designed to carry out at least one of the following processing steps on the containers or components: heating in particular of preforms or container bodies; forming in particular of container bodies, cooling in particular of container bodies; overhead turning in particular of container bodies; inner coating in particular of container bodies; printing in particular of container bodies, labeling in particular of container bodies; cleaning in particular of container bodies; filling of liquids; and closing in particular by applying closure caps.

Preferably, the control system is programmed with a physical calculation model for simulating the processing and/or the transport of the containers or the components in at least one of the process units taking into account the measured material characteristic/intensive state variable in order to allow a simulation result resulting therefrom in particular during ongoing production to be incorporated into the machine open-loop/closed-loop control of the process unit and/or into the specification of its performance characteristic values and design features.

Preferably, at least one of the process units has a plurality of functional modules which, in the computer model, can be simulated both individually with consideration of the measured material characteristic/intensive state variable and, based on this, together with the interaction in the process unit in order to adapt the power specification and/or design of the process unit to a variation of the material characteristic/intensive state variable or vice versa.

Complex relationships between individual treatment steps and/or transport steps can thus be analyzed in a targeted manner by considering the individual process steps and their interaction in order to improve production results and/or to specifically increase the production power of the process units or of the production system.

Preferably, the inspection unit/at least one of the inspection units is designed for random-sample quality control of associated components prior to their integration into the product stream. For example, a specific quantity of provided preforms or closure caps of a batch can be checked and statistically evaluated representatively. The random-sample/representative checking of a portion of a label strip provided on a roll is also conceivable. The corresponding components are then supplied in non-singularized form only after the random-sample-like measurement has been carried out.

The inspection unit/at least one of the inspection units is preferably formed in the running product stream/partial product stream for the object-related gap-free quality control of the components. The corresponding material characteristics/intensive state variables can then be monitored continuously for the individual components during ongoing production operation, and it can be provided for example as accompanying information over a plurality of production processes.

BRIEF DESCRIPTION OF THE FIGURES

Preferred embodiments of the invention are illustrated in the drawing. In the figures.

DETAILED DESCRIPTION

Figure 1:
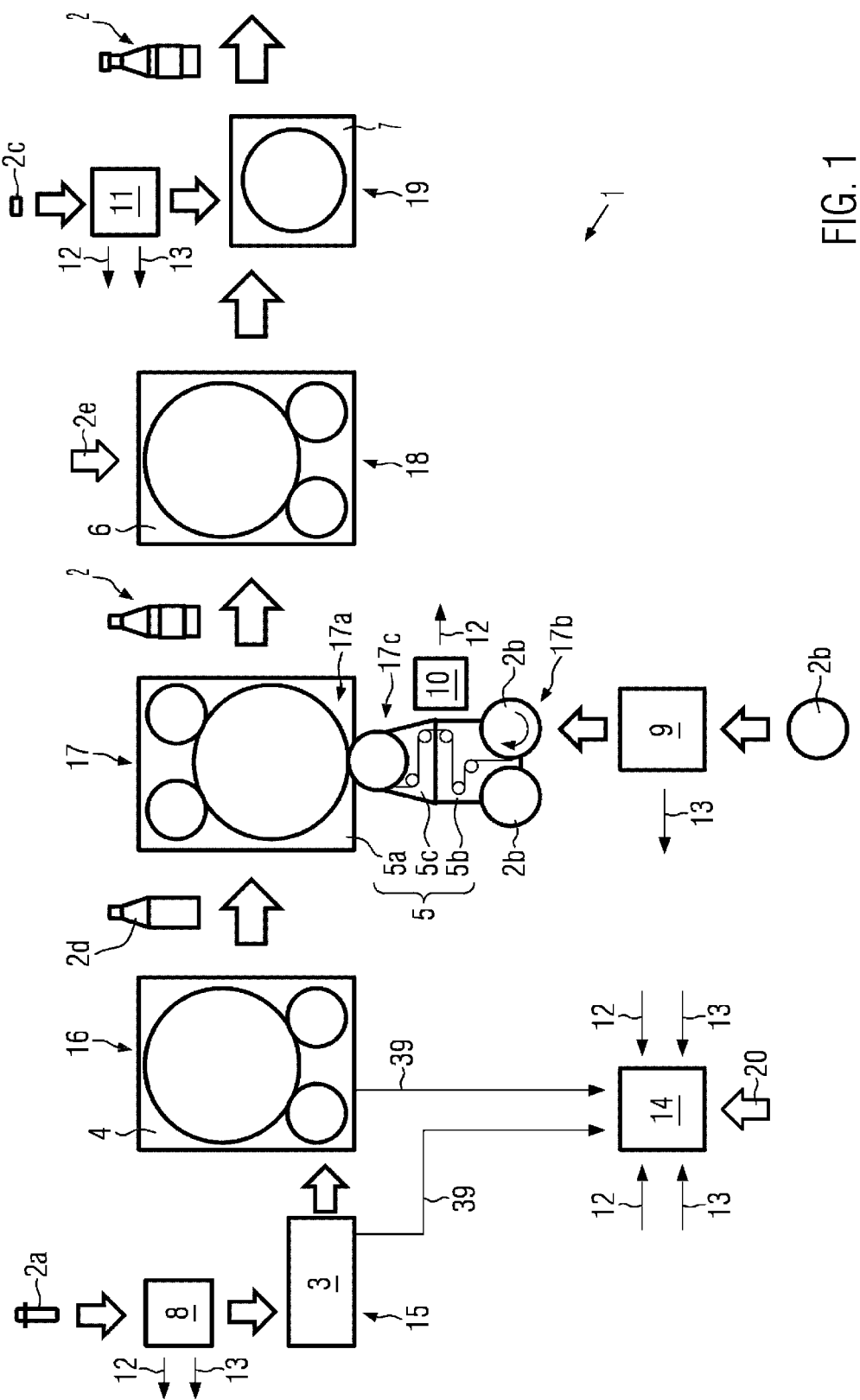
FIG. 1 shows a schematic representation of the production system.

As can be seen from FIG. 1, the production system 1 comprises, for producing, processing and/or filling containers 2, mechatronic process units 3-7 for treating and/or transporting the containers 2 and/or components 2a, 2b, 2c thereof provided in the form of solid bodies. These are, for example, first components 2a in the form of preforms, second components 2b in the form of label rolls or singularized labels, and third components 2c in the form of closure caps.

The production system 1 further comprises inspection units 8-11 for input-side inspection of the components 2a, 2b, 2c, i.e. before a respectively associated processing step, which can be a production process overall or a partial process thereof, as will be explained below. The inspection units 8-11 are each designed to measure at least one intensive state variable 12, which is imperceptible visually (i.e., for example, with the naked eye), and/or material characteristic 13 of the components 2a, 2b, 2c.

The intensive state variable 12 is, for example, a temperature or a humidity of the corresponding component 2a-2c.

The material characteristic 13 is, for example, an elasticity characteristic value or a coefficient of friction of the particular component 2a-2c.

In principle, it is conceivable for the individual inspection units 8-11 to measure only a single intensive state variable 12 (here on the inspection unit 10), only a single material characteristic 13 (here on the inspection unit 9) or any combinations of these variables.

The intensive state variable 12 and/or the material characteristic 13 is then in each case transmitted to a merely schematically indicated control system 14 for open-loop/closed-loop control of the process units 3-7 for electronic data processing there.

A first process unit 3 arranged on the input side in the example shown accordingly serves, for a first production process 15, to heat the previously inspected components 2a for the subsequent shaping of the containers 2 in a second production process 16, which is carried out in a second process unit 4 formed as a stretch blow molding machine. The containers 2 then initially consist only of their container bodies 2d.

Subsequently, the container bodies 2d are labeled in a third production process 17 in the region of a third process unit 5 with the components 2b, and the containers 2 successively constructed in this way are again filled in a fourth production process 18 from a fourth process unit 6, a filling machine, with a liquid product 2e, for example a beverage.

A fifth process unit 7 for carrying out a fifth production process 19, in which the filled containers 2 are closed with the components 2c in the form of closure caps, is also shown by way of example.

The example of the third process unit 5 schematically indicates that the process units can generally comprise a plurality of functional modules for carrying out sub-processes, in this case the functional modules 5a, 5b, 5c, in which sub-processes 17a, 17b, 17c of the third production process 17, i.e., the labeling of the containers 2/container bodies 2d, are carried out.

In the example shown, a first functional module 5a serves to transport and position the container bodies 2d to be labeled in a sub-process 17a. A second functional module 5b is used to provide the components 2b first in non-singularized form as a label strip in a sub-process 17b, which comprises, for example, the continuous transport and the necessary buffering of the label strip. A third functional module 5c then serves to provide the components 2b in singularized form, i.e., as labels, and for attaching the labels to the container bodies 2d in a third partial process 17c.

As shown in FIG. 1 in this respect, individual inspection units 9, 10 can also be assigned to different sub-processes 17b, 17c in each case on the input side. In the example shown, the inspection unit 9 on the input side with respect to the partial process 17b serves, for example, to determine an elasticity characteristic value which is a material characteristic 13, and is primarily relevant during transport and during the buffering of the label strip. In addition, for example, the input-side inspection unit 10 with respect to the sub-process 17c can then measure an intensive state variable 12, for example a temperature of the label strip, which could be relevant, for example, during singularization into labels.

However, these are only examples of how at least one intensive state variable 12 and/or material characteristic 13 can be measured on the input side (relative to the corresponding production process 15-19 or sub-process 17a, 17b, 17c) at the components 2a, 2b, 2c of the containers 2 provided in the form of solid bodies.

In addition, extensive state variables of the components 2a, 2b, 2c can be measured in a manner known in principle, such as a weight, an electrical charge or the like. Likewise, additional measurements of visually perceptible material characteristics and/or intensive state variables are conceivable, such as a color or turbidity of the components 2a, 2b, 2c. Intensive state variables of components of the containers 2 provided as fluid can also be measured in a manner known in principle, such as the viscosity of glue, its temperature or the like. Such measurements known in principle have not been shown for the sake of clarity.

As can also be seen from FIG. 1, the process units 3-7 in the sense of the present invention are mechatronic units in which certain processing steps are carried out on the containers 2 or the components 2a, 2b, 2c, such as heating preforms, shaping, cooling, overhead turning, internal coating, printing, labeling, and/or cleaning of containers 2/container bodies 2d, filling of liquid products 2e into the containers 2, and/or closing the latter, for example by applying closure caps.

The process units 3-7 can also be understood as processing machines which can adapt functional modules 17a, 17b, 17c as functional groups of the corresponding processing machine, for example in the form of aggregates which, if necessary, could also be integrated in a modular/temporary manner into the corresponding process unit 3-7, for example in order to adapt a production process type-specifically.

The intensive state variables 12 and/or material characteristics 13 measured in the region of the production system 1 are used in the control system 14 for runtime control of at least one of the process units 3-7, i.e., for their open-loop/closed-loop control during the ongoing production operation, and/or in at least one physical calculation model 20 implemented in the control system 14. At least one production process 15-9 and/or sub-process 17a, 17b, 17c can thus be simulated for the treatment and/or for the transport of the containers 2 or their components 2a, 2b, 2c taking into account at least one of the measured material characteristic (s) 13 and/or intensive state variable(s) 12.

Figure 2:
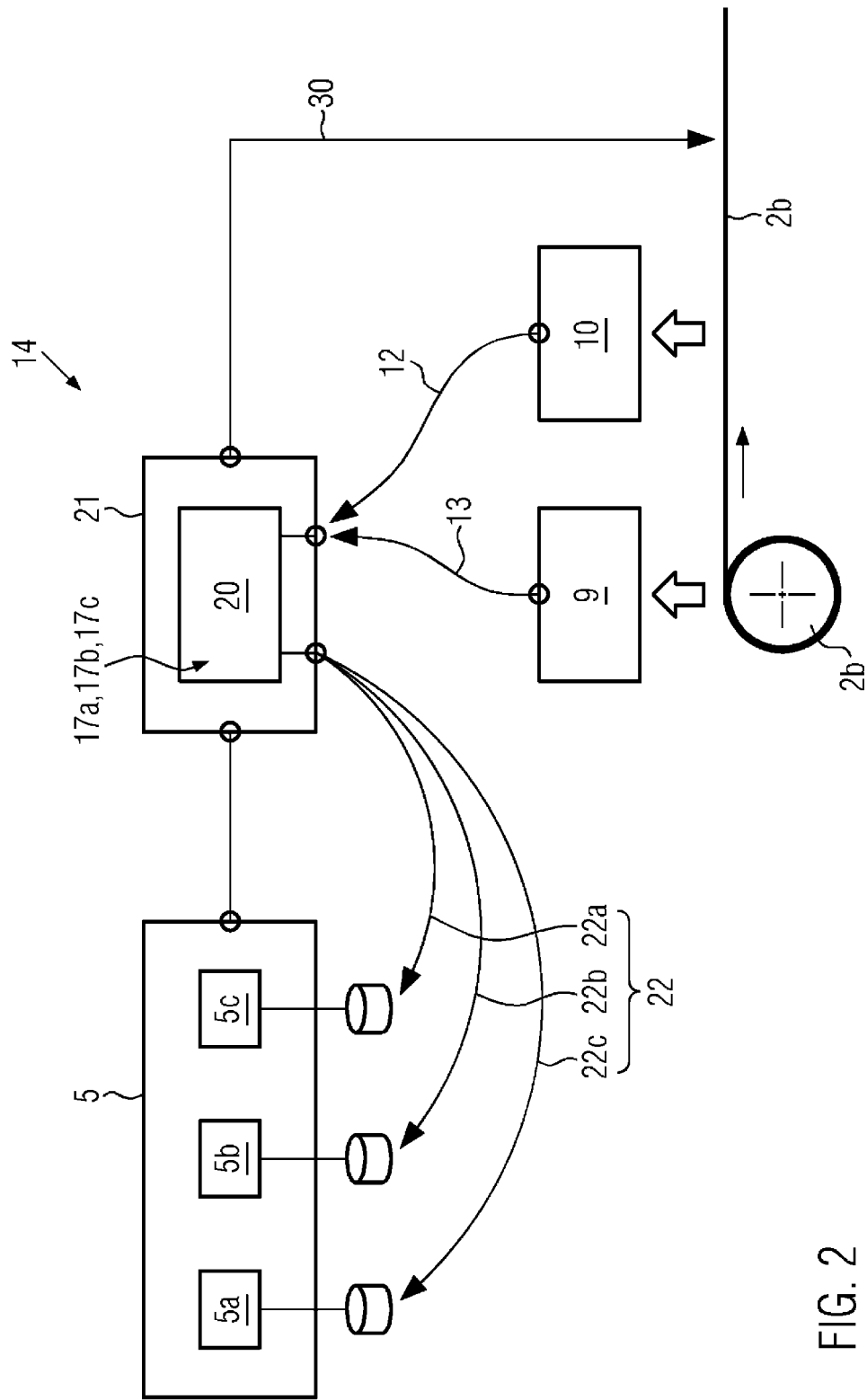
FIG. 2 shows a schematic representation of a production process.

FIG. 2 schematically shows a detail from the basic architecture of the control system 14, namely, by way of example, with respect to the control of the third process unit 5 and its functional modules 5a, 5b, 5c on the basis of a simulation of the associated production process 17 or its sub-processes 17a, 17b and/or 17c in the physical calculation model 20.

Accordingly, for example, the inspection unit 9 could measure a material characteristic 13 of the components 2b, i.e., of a label strip provided on the roll, in a random-sample-like manner for the particular roll and can transmit it to a calculation unit 21 of the control system 14. The material characteristic 13 is then, for example, an elasticity characteristic value which is particularly relevant for the sub-process 17b. The inspection unit 9 can then be understood such that it is immediately connected upstream of the sub-process 17b, i.e., the provision of the roll, the continuous transport, and the buffering of the label strip.

Accordingly, the inspection unit 10 could measure an intensive state variable 12 of the components 2b, for example the temperature of the label strip immediately before its singularization into labels and thus directly upstream of the sub-process 17c. Such a measurement could take place continuously in the partial product stream of the components 2b, i.e., individually for each individual label, based on the immediately subsequent singularization. The intensive state variable 12 determined in this manner is transmitted individually for each label to the computing unit 21.

Both the material characteristic 13 determined, for example, in a batch-specific manner (here per roll) and the intensive state variable 12, which is determined, for example, with respect to the object (here for each label), can be individually assigned to each label and thus to each container 2 equipped therewith, and can accompany this as a data record 30 for further production processes 18, 19.

In principle, this enables a running assignment of previously determined material characteristics 13 and/or intensive state variables 12 to individual production processes 15-19 and/or individual sub-processes 17a, 17b, 17c.

On this basis, the computing unit 21 can transmit updated machine and/or processing parameters 22 to the process unit 5 assigned here by way of example, optionally updated machine/processing parameters 22a, 22b, 22c for individual functional modules 5a, 5b, 5c. As a result, the production operation in the individual process units 3-7 can be continuously adapted to properties of the components 2a, 2b, 2c that are optionally variable with respect to the object in question and/or with respect to the batch in question.

The physical calculation model 20 can be integrated into a system model (not shown) of the production system 1 and/or of the corresponding process unit 3-7, with which, for example, product streams, data streams, communication paths and/or interactions between the individual process units 3-7 can be mapped and simulated by calculation. The process units 3-7 can then be subject to open-loop/closed-loop control on the basis of the system model.

Figure 3:
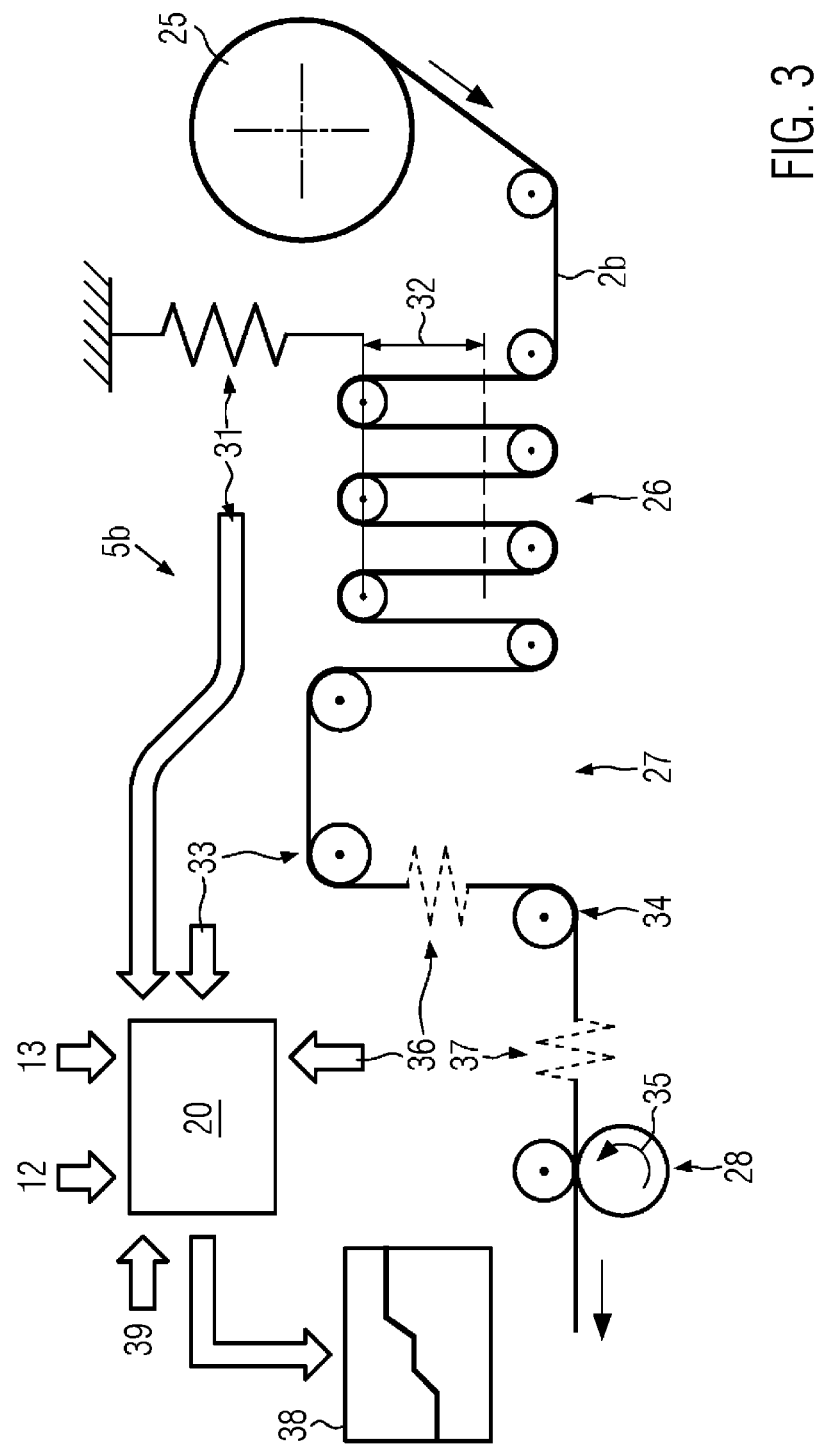
FIG. 3 shows a schematic physical model of a production process.

In this context, FIG. 3 illustrates how mechatronic components of individual process units and/or functional modules can be taken into account in the calculation model 20, on the basis of the functional module 5b for transporting and buffering the components 2b of the containers 2, that is to say of the label strip immediately before it is singularized into labels by the functional module 5c following in the partial product flow.

Accordingly, the functional module 5b comprises, for example, a film plate 25 on which the label strip, i.e. the components 2b of the container 2, are provided. A loop buffer 26, a track control section 27, and a conveyor roller 28 for the label strip adjoin in the conveying direction.

For physical modeling of the label strip transport and the buffering between the film plate 25 and the conveyor roller 28, for example, a buffer bias 31, a buffer position 32 of the movable deflection rollers, a torque 33, 34 measured at the label strip deflection, and a drive torque 35 of the conveyor roller 28 can be used. It would also be conceivable to measure a label strip voltage 36, 37 between individual deflection rollers and/or upstream of the conveyor roller 28.

On the basis of the previously measured material characteristic 13, in the example an elasticity characteristic of the label strip, it is possible, for example, to calculate how the conveying path behaves per time and/or the label voltage behaves per time when the label strip transport starts. Such simulation results 38 can, for example, be created by varying material characteristics 13, such as an elasticity characteristic value and/or a coefficient of friction of the label strip, also for different design features, such as, for example, diameters and inertia moments of deflection rollers. Other machine parameters, such as the bias 31, could also be simulated by calculation, likewise different machine powers, which can have an effect, for example, on the speed during starting after a label strip change.

If, for example, a material characteristic 13 is measured in batches for different label formats, the variation of the material characteristic 13 can be estimated overall. The power specification of the corresponding process unit 5 can lastly be adapted thereto, and/or constructive measures can be carried out in a targeted manner in order to adhere to a predefined power specification with the given variation of the material characteristic 13. For example, the diameters of deflection rollers could be adapted in a targeted manner for this purpose.

In principle, measured intensive state variables 12 can be taken into account for optimizing process units 3-7 and/or production processes 15-19 or sub-processes 17a, 17b, 17c.

The physical calculation model 20 can be created on the basis of known calculation/simulation programs, such as MATLAB:SIMULINK, and flexibly adapted, by programming, to the material characteristics 13, intensive state variables 12, and machine and treatment parameters 22, 31 to 38 to be considered in each case.

In this case, the physical calculation model 20 is preferably so extensive that at least one of the production processes 15-19 mentioned is taken into account by the corresponding infeed of the components 2a, 2b, 2c up to the corresponding equipping of the container bodies 2d/containers 2, preferably a plurality of successive production processes 15-19. A plurality of such physical computing models 20 can also be integrated into an overarching system model of the production system 1.

In this case, all measurement results known from conventional monitoring methods, such as, for example, from optical inspections, intermediate controls, measurement of extensive state variables or the like, can also be incorporated into the corresponding modeling.

Inspection results, for example production results 39 of the individual production processes 15-19, obtained, as is known in principle, in the course of ongoing production, can be compared with the measured material characteristics 13 and/or intensive state variables 12 in the control system 14 in order to provide open-loop/closed-loop control of the corresponding process unit 3-7 in an adapted manner (FIG. 1), and/or processed in the calculation model 20 (FIG. 3).

The measured material characteristics 13 and/or intensive state variables 12 are individually assigned to the containers 2 as an electronic mark as soon as available, preferably during their entire subsequent production cycle, and accompany them through further production processes.

The example shown relates to the production and treatment of plastics containers, in particular PET bottles, and the production processes 15-19 known for this purpose.

For example, in the case of glass bottles or cans, other process units and production processes could instead be subject to open-loop/closed-loop control and/or simulated, in principle in the same way.

For example, finished container bodies are then provided and optionally cleaned. Corresponding material characteristics 13 and/or intensive state variables 12 are then also to be measured before the corresponding processing of the components of such containers provided as solid bodies and are to be transmitted to the control system 14/the control unit 21. The physical modeling of individual process units, functional modules comprised thereof, associated production processes, and/or sub-processes can then also take place in the manner described above in the control unit 21 on the basis of at least one physical calculation model 20.

The invention claimed is:

1. A method for production control and/or system specification of a production system for producing, processing and/or filling of containers, wherein at least one visually imperceptible intensive state variable or material characteristic of components, provided as solid bodies, of the containers is measured in an area of the production system with respect to a batch in question and/or with respect to an object in question, and at least one production process running therein for treating and/or for transporting the components/containers is controlled by machine on the basis of the measured material characteristic and/or intensive state variable, and wherein the at least one intensive state variable or material characteristic is measured on an input side with respect to the corresponding production process or sub-process.

2. The method according to claim 1, wherein the provided components are preforms, container bodies, labels, label strips, closure caps, and/or packaging films.

3. The method according to claim 1, wherein the material characteristic is an elasticity characteristic value or a coefficient of friction and the intensive state variable is a temperature or a humidity.

4. The method according to claim 1, wherein the components/containers are assigned the material characteristic/intensive state variable measured thereon over a plurality of production processes in the form of an accompanying data set.

5. The method according to claim 4, wherein furthermore a production result that is measured for monitoring at least one of the production processes is assigned to the containers/components thereof individually and is calculated by machine with the associated material characteristic/intensive state variable, and wherein a calculation result resulting therefrom flows into a machine open-loop/closed-loop control of at least the monitored production process and/or into the specification of associated power characteristic values and design features.

6. The method according to claim 5, wherein the measured material characteristic/intensive state variable is processed in a physical calculation model for simulation of the production process or at least one sub-process thereof, and a simulation result resulting therefrom flows into the machine open-loop/closed-loop control of the production process and/or into the specification of associated power characteristic values and design features.

7. The method according to claim 5, wherein the production process is parameterized type-specifically automatically on the basis of the measured material characteristic/intensive state variable.

8. The method according to claim 1, wherein, furthermore, at least one extensive state variable and/or dimensions of the components are measured with respect to the batch in question and/or with respect to the object in question in a region of the production system and, together with the material characteristic and/or intensive state variable, flows into the control and/or a calculation modeling of the production process.

9. The method according to claim 7, wherein the corresponding production process relates to one of the following treatment steps on the components/containers: heating of preforms or container bodies, forming of container bodies, cooling of container bodies, overhead turning of container bodies, inner coating of container bodies, printing of container bodies, labeling of container bodies, cleaning of container bodies, filling of liquids; and closing by applying closure caps.

10. A production system for producing, processing and/or filling containers, with mechatronic process units for processing and/or transporting the containers or their components provided as solid bodies, and comprising a control system for open-loop/closed-loop control of the process units, according to the method according to claim 1, comprising at least one input-side inspection unit for measuring before a respectively associated processing step, with respect to the batch in question and/or individually with respect to the object in question, at least one visually imperceptible intensive state variable or material characteristic of the components, wherein the control system is programmed for open-loop/closed-loop control of at least one of the process units, taking into account the measured material characteristic/intensive state variable.

11. The production system according to claim 10, wherein the individual process units are designed to carry out at least one of the following treatment steps on the containers or components: heating of preforms or container bodies, forming of container bodies, cooling of container bodies; overhead turning of container bodies; inner coating of container bodies; printing of container bodies; labeling of container bodies; cleaning of container bodies; filling of liquids; and closing by applying closure caps.

12. The production system according to claim 10, wherein the control system is further programmed with a physical calculation model for simulating the processing and/or transport of the containers or the components in at least one of the process units taking into account the measured material characteristic/intensive state variable in order to allow a simulation result resulting therefrom during ongoing production to be incorporated into the machine open-loop/closed-loop control of the process unit and/or into the specification of its performance characteristic values and design features.

13. The production system according to claim 12, wherein at least one of the process units has a plurality of functional modules which can be simulated in the calculation model both individually, taking into account the measured material characteristic/intensive state variable and, based on this, together with an interaction in the process unit, in order to adapt a power specification and/or construction of the process unit to a variation of the material characteristic/intensive state variable or vice versa.

14. The production system according to claim 10, wherein the inspection unit/at least one of the inspection units is designed for random-sample quality control of the respectively associated components before being integrated into an associated product stream/partial product stream.

15. The production system according to claim 14, wherein the inspection unit/at least one of the inspection units is formed in an associated product stream/partial product stream for gap-free quality control of the components with respect to the object in question.

16. The method according to claim 6, wherein the measured material characteristic/intensive state variable is processed during ongoing production.

* * * * *